US010292071B2

(12) United States Patent
Iriyama et al.

(10) Patent No.: US 10,292,071 B2
(45) Date of Patent: May 14, 2019

(54) NAVIGATION DEVICE, NAVIGATION METHOD, NON-TRANSITORY COMPUTER READABLE STORAGE MEDIUM, AND NAVIGATION CONTROL METHOD OF A TERMINAL DEVICE FOR PROVIDING CONGESTION INFORMATION TO A USER

(71) Applicant: YAHOO JAPAN CORPORATION, Tokyo (JP)

(72) Inventors: Takamitsu Iriyama, Tokyo (JP); Kazuhiro Ninomiya, Tokyo (JP); Michitaka Ohno, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 96 days.

(21) Appl. No.: 15/404,538

(22) Filed: Jan. 12, 2017

(65) Prior Publication Data
US 2017/0208497 A1    Jul. 20, 2017

(30) Foreign Application Priority Data
Jan. 20, 2016   (JP) .................................. 2016-009180

(51) Int. Cl.
*H04B 7/204* (2006.01)
*H04W 28/02* (2009.01)
*H04L 12/801* (2013.01)

(52) U.S. Cl.
CPC ......... *H04W 28/0289* (2013.01); *H04L 47/12* (2013.01)

(58) Field of Classification Search
CPC ... H04W 28/0289; G06N 5/04; G06N 99/005; G01C 21/00; G01C 21/3484; G01C 21/362
See application file for complete search history.

(56) References Cited

U.S. PATENT DOCUMENTS 9,923,830 B2 *   3/2018   Park .................... H04L 47/23
2006/0161334 A1 *   7/2006   Teramae .............. G01C 21/005
                                                    701/117

(Continued)

FOREIGN PATENT DOCUMENTS

JP    2008-102046 A    5/2008
JP    2009-232415 A    10/2009

(Continued)

OTHER PUBLICATIONS

Aug. 8, 2017 Office Action issued in Japanese Patent Application No. 2016-009180.

(Continued)

*Primary Examiner* — Abdelnabi O Musa
(74) *Attorney, Agent, or Firm* — Oliff PLC

(57) ABSTRACT

According to one aspect of an embodiment an information providing device includes a communication unit that communicates with a terminal device used by a user. The information providing device includes an information provision control unit that generates provided information provided to the user in the terminal device and optionally including congestion information presenting a congestion condition and cause the communication unit to transmit the generated provided information to the terminal device. The information providing device includes a derivation unit that derives sensitivity with respect to the congestion information based on information received by the communication unit from the terminal device after the provided information including the congestion information has been transmitted. The information provision control unit of the information providing device generates the provided information based on the sensitivity derived by the derivation unit.

17 Claims, 17 Drawing Sheets

(56) References Cited

U.S. PATENT DOCUMENTS

| 2007/0019562 A1* | 1/2007 | Kim ............... G01C 21/36 |
| | | 370/252 |
| 2009/0237413 A1* | 9/2009 | Ogawa ........... G01C 21/3605 |
| | | 345/548 |
| 2014/0278070 A1* | 9/2014 | McGavran ......... G01C 21/00 |
| | | 701/465 |

FOREIGN PATENT DOCUMENTS

| JP | 2011-145130 A | 7/2011 |
| JP | 2012-113544 A | 6/2012 |
| JP | 2012-220446 A | 11/2012 |
| WO | 2006/070583 A1 | 7/2006 |
| WO | 2014/006688 A1 | 1/2014 |

OTHER PUBLICATIONS

Mar. 28, 2017 Office Action issued in Japanese Patent Application No. 2016-009180.

* cited by examiner

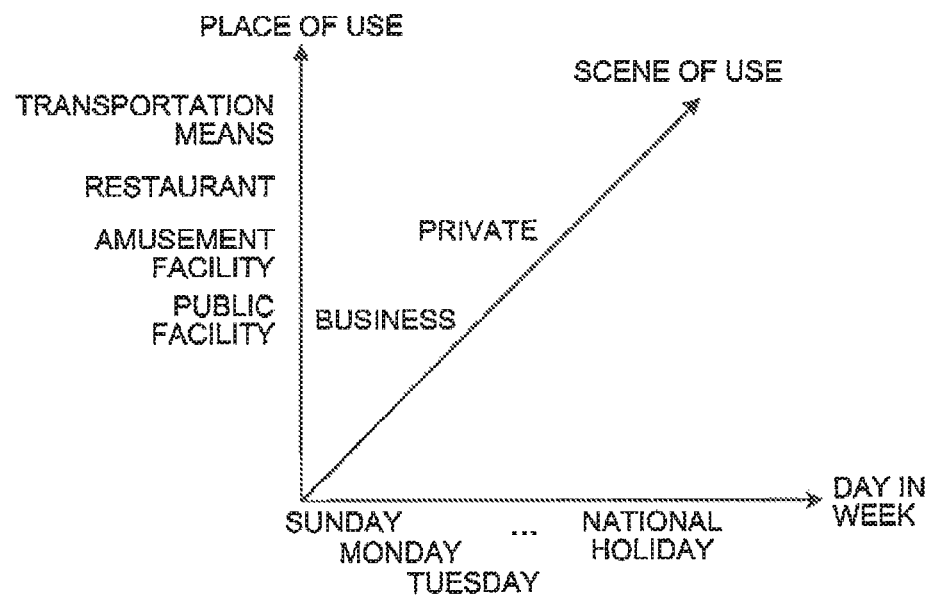

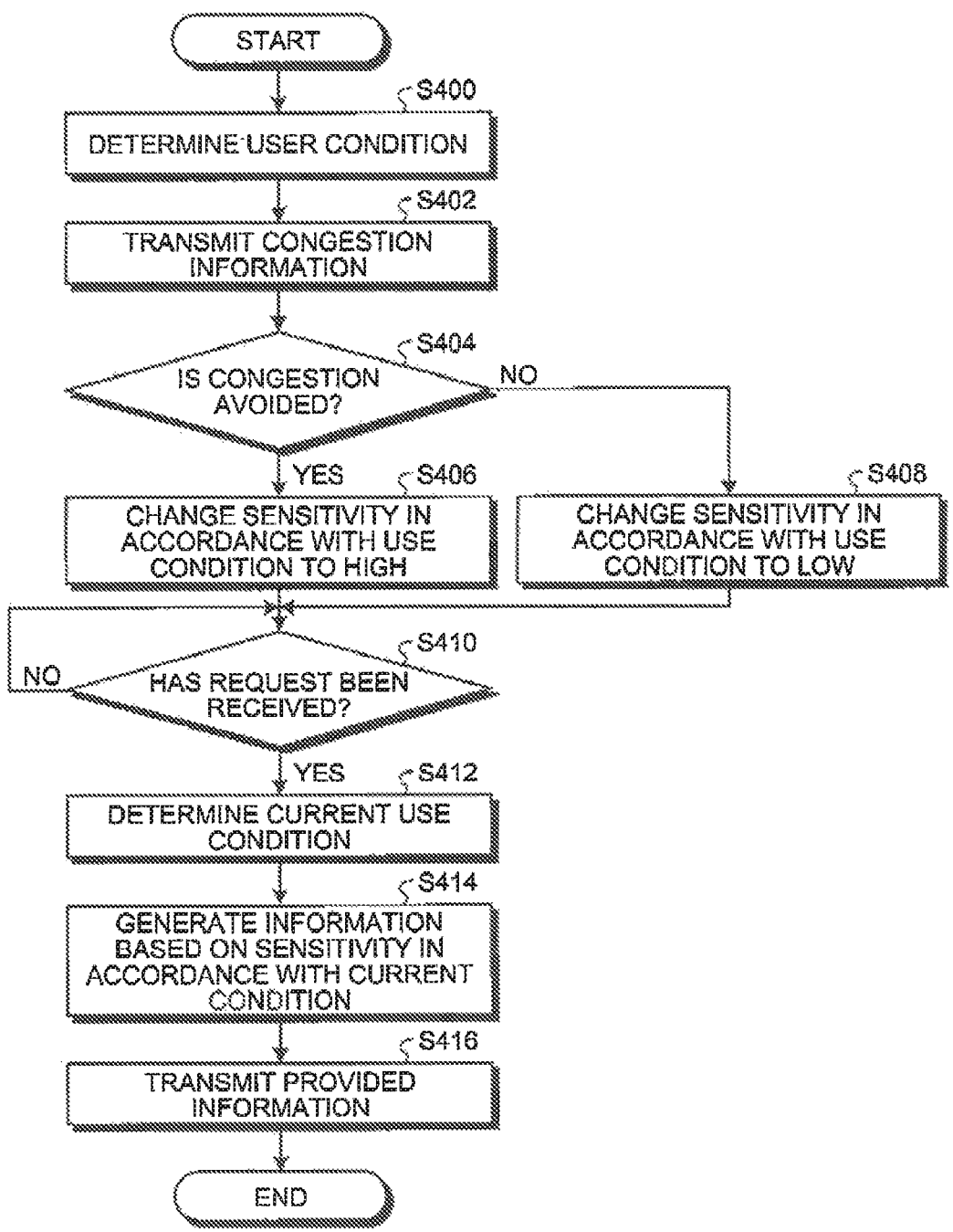

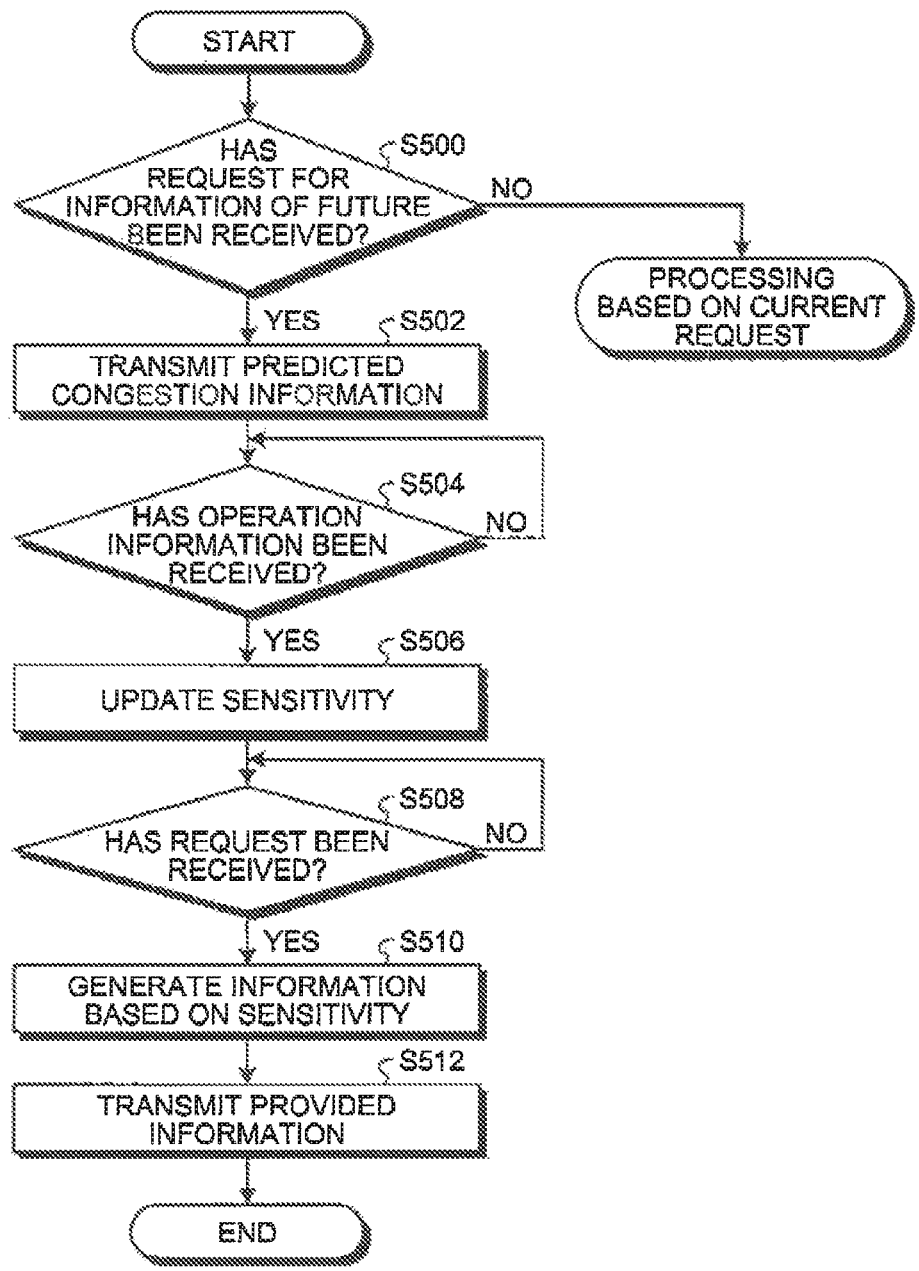

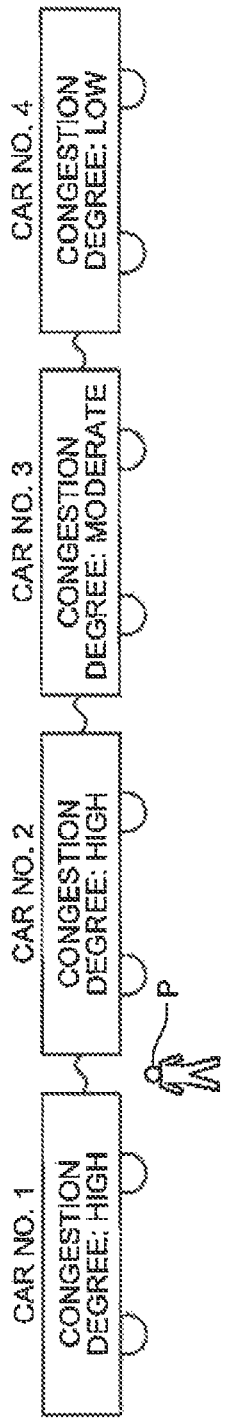

NAVIGATION DEVICE, NAVIGATION METHOD, NON-TRANSITORY COMPUTER READABLE STORAGE MEDIUM, AND NAVIGATION CONTROL METHOD OF A TERMINAL DEVICE FOR PROVIDING CONGESTION INFORMATION TO A USER

CROSS-REFERENCE TO RELATED APPLICATIONS

The present application claims priority to and incorporates by reference the entire contents of Japanese Patent Application No. 2016-009180 filed in Japan on Jan. 20, 2016.

BACKGROUND OF THE INVENTION

1. Field of the Invention

The present invention relates to an information providing device, an information providing method, a non-transitory computer readable storage medium, and a control method of a terminal device.

2. Description of the Related Art

Conventionally, a server device has been known that provides information of a facility such as a restaurant with consideration for the congestion condition thereof. This server device determines the congestion degree of a facility and transmits information of the restaurant to a mobile terminal device or other devices based on the determined congestion degree.

Patent Document 1: Japanese Patent Application Laid-open No. 2012-113544.

However, the feeling about the congestion degree varies among different individuals. With conventional techniques, there have been some cases where information cannot be provided based on the feeling of the user about the congestion. As a result, there have been some cases where effective information provision cannot be performed.

SUMMARY OF THE INVENTION

It is an object of the present invention to at least partially solve the problems in the conventional technology.

According to one aspect of an embodiment an information providing device includes a communication unit that communicates with a terminal device used by a user. The information providing device includes an information provision control unit that generates provided information provided to the user in the terminal device and optionally including congestion information presenting a congestion condition and cause the communication unit to transmit the generated provided information to the terminal device. The information providing device includes a derivation unit that derives sensitivity with respect to the congestion information based on information received by the communication unit from the terminal device after the provided information including the congestion information has been transmitted. The information provision control unit of the information providing device generates the provided information based on the sensitivity derived by the derivation unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a diagram illustrating an example of a plurality of conditions under which a user can be put according to the third embodiment;

FIG. 15 is a diagram illustrating an example of sensitivity information per user condition 133;

FIG. 16 is a flowchart illustrating an example of the flow of processing performed by the information providing device 100A according to the third embodiment;

FIG. 17 is a flowchart illustrating an example of the flow of processing performed by the information providing device 100 according to a fourth embodiment;

FIGS. 19A and 19B are diagrams each explaining processing according to a second modification;

FIG. 20 is a diagram explaining a first application example;

DETAILED DESCRIPTION OF THE PREFERRED EMBODIMENTS

An information providing device, an information providing method, a non-transitory computer readable storage medium, and a control method of a terminal device to each of which the present invention is applied will be described below with reference to the drawings.

First Embodiment

A first embodiment will be described below. An information providing system 1 according to the first embodiment causes a terminal device owned by a user to display provided information including congestion information and derives the sensitivity of the user with respect to congestion based on information transmitted from the terminal device as a result of the display. The information providing system 1 according to the first embodiment then controls information provided to the user based on the derived sensitivity of the user, thereby providing information more effectively.

Figure 1:
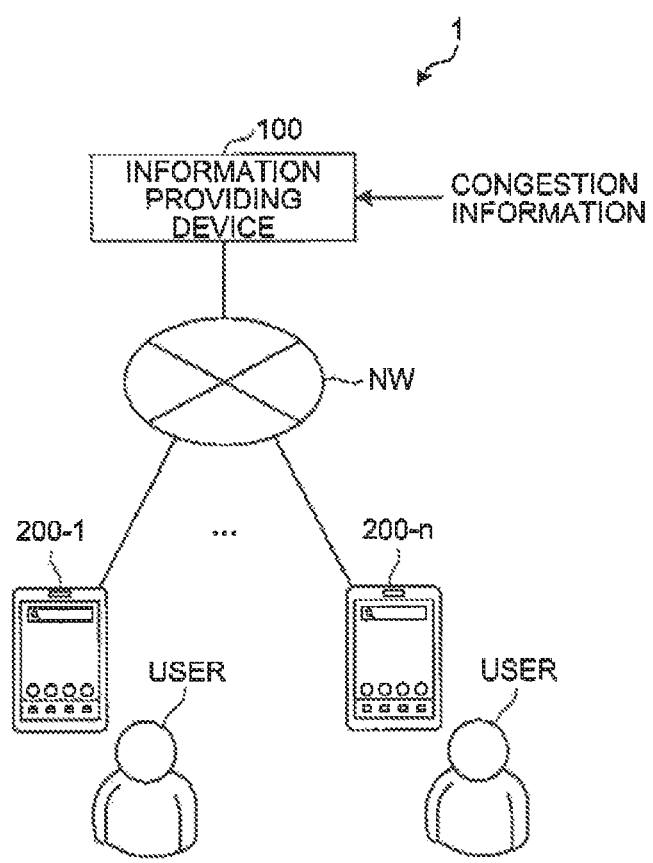
FIG. 1 is a diagram illustrating an example of an information providing system 1 according to a first embodiment.

FIG. 1 is a diagram illustrating an example of the information providing system 1 according to the first embodiment. The information providing system 1 includes an information providing device 100 and a plurality of terminal devices 200-1 to 200-$n$ ($n$ is a natural number equal to or larger than 2), for example. In the information providing system 1, the information providing device 100 and the terminal devices 200-1 to 200-$n$ communicate information with one another via a network NW. The network NW includes a wireless base station, a Wi-Fi access point, a communication line, a provider, and the Internet. It should be noted that in the following explanation, when a terminal device is not differentiated from the other ones, the terminal device is referred to as a "terminal device 200."

Figure 2:
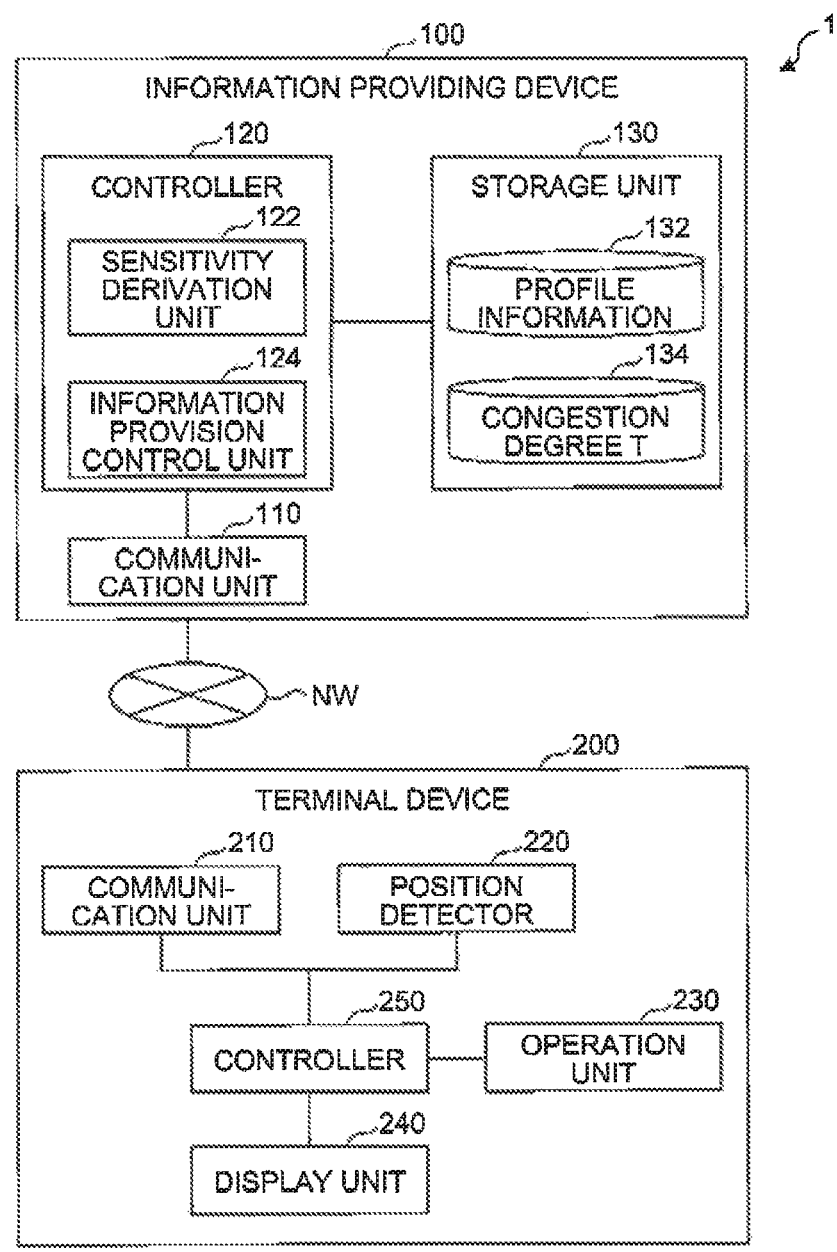
FIG. 2 is a block diagram illustrating an example of the information providing system 1 according to the first embodiment.

FIG. 2 is a block diagram illustrating an example of the information providing system 1 according to the first embodiment. The information providing device 100 includes a communication unit 110, a controller 120, and a storage unit 130, for example.

The communication unit 110 includes a network interface card (NIC), for example. The communication unit 110 performs communication with the terminal device 200 used by the user via the network NW.

The controller 120 may include a sensitivity derivation unit 122 and an information provision control unit 124. However, the embodiment is not limited thereto. A functional part that includes the sensitivity derivation unit 122 and the information provision control unit 124 is implemented with a processor such as a central processing unit (CPU) executing a computer program stored in a program memory. Furthermore, part or all of the functional part that includes the sensitivity derivation unit 122 and the information provision control unit 124 may be implemented by hardware such as a large scale integration (LSI), an application specific integrated circuit (ASIC), or a field-programmable gate array (FPGA).

After the provided information including congestion information is transmitted, the sensitivity derivation unit 122 derives the sensitivity with respect to the congestion information for each user, based on the information received by the communication unit 110 from the terminal device 200. In the information received by the communication unit 110 from the terminal device 200, operation information or position information may be included. The operation information is information with respect to an operation performed in the terminal device 200. The position information is information representing the position of the terminal device 200 owned by the user. The sensitivity derivation unit 122 derives the sensitivity based on the operation information or the position information. The sensitivity derivation unit 122 causes the storage unit 130 to store therein the derived sensitivity.

The information provision control unit 124, based on the sensitivity derived by the sensitivity derivation unit 122 and stored in the storage unit 130, causes the communication unit 110 to transmit the provided information. The provided information is processed by the terminal device 200 and thereby provided to the user in the terminal device 200. In the provided information, congestion information representing the congestion condition may be included.

The storage unit 130 is implemented by a hard disc drive (HDD), a flash memory, an electrically erasable programmable read only memory (EEPROM), a read only memory (ROM), or a random access memory (RAM), for example. The storage unit 130 stores therein various computer programs such as firmware and an application program, processing results from various functional parts, and information that the communication unit 110 has acquired from the terminal device 200, for example.

The storage unit 130 stores therein profile information 132 and a congestion degree table (congestion degree T) 134, for example.

Figure 3:
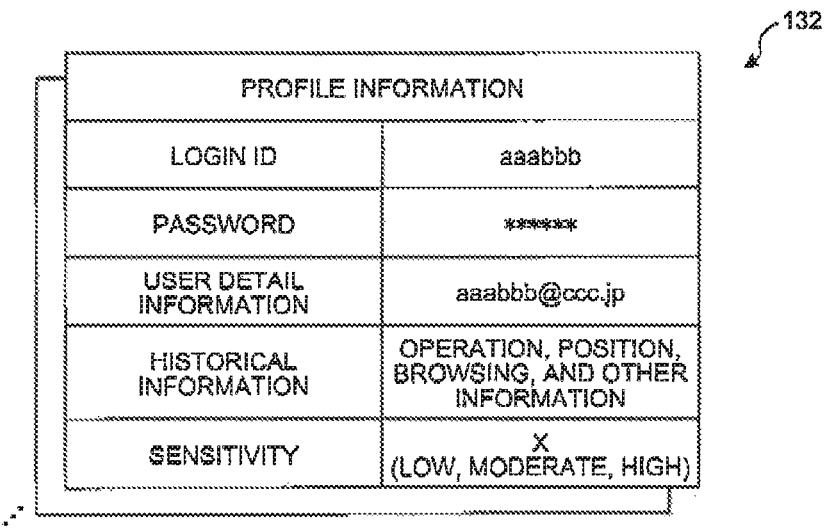
FIG. 3 is a diagram illustrating an example of profile information 132.

The profile information 132 is a collection of pieces of information associated with each user and stored in the storage unit 130 for each user. FIG. 3 is a diagram illustrating an example of the profile information 132. The profile information 132 includes a login ID (identifier) being an example of user identification information, a password, user detail information, historical information, and sensitivity. It should be noted that the contents of the profile information 132 are not limited thereto. The login ID and the password are pieces of information that the user can optionally decide. The user detail information includes an e-mail address of the terminal device 200, for example. The historical information includes histories of the operation information, the position information, and the provided information that has been already viewed, which have been transmitted from the terminal device 200. The sensitivity is information indicating the degree of reaction made by the user with respect to the congestion information. There is a tendency that the more the user reacts with respect to the congestion information, the higher value (or a sign indicating the higher value) the sensitivity becomes, and the less the user reacts, the lower value (or a sign indicating the lower value) the sensitivity becomes. The sensitivity is derived as a numerical value from 0 to 100, for example. Ranking may be used with 0 to 30 representing "low", 31 to 70 representing "moderate", and 71 to 100 representing "high." Alternatively, the sensitivity may be presented by continuous values.

Figure 4:
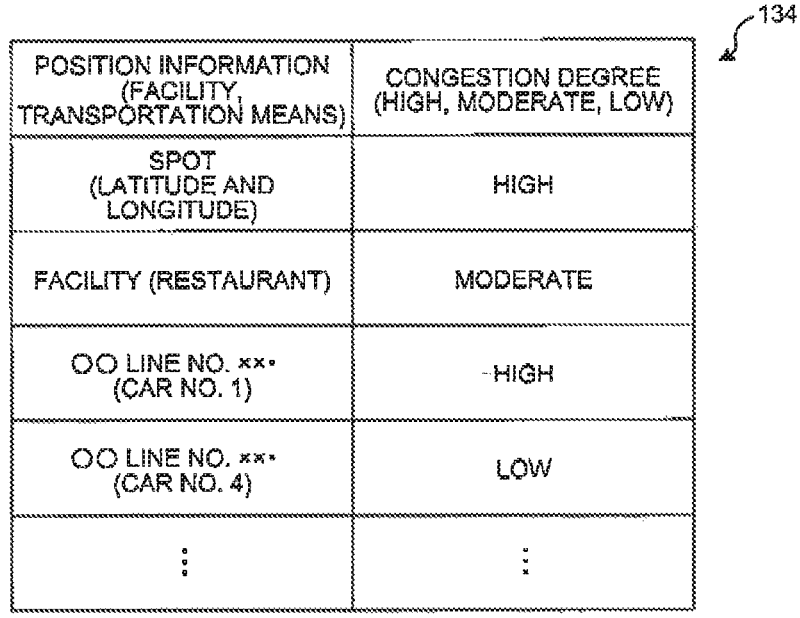
FIG. 4 is a diagram illustrating an example of a congestion degree table 134.

The congestion degree table 134 is information presenting the congestion condition of an optional position or a transportation means, for example. FIG. 4 is a diagram illustrating an example of the congestion degree table 134. The congestion degree table 134 is original information of the congestion information transmitted to the terminal device 200. The congestion degree table 134 includes the position information and the congestion degree, for example. The position information includes the position of an optional spot, the position of a facility, or a position of a transportation means, for example. Each position is represented by the latitude and the longitude. Furthermore, the altitude may be added. A facility is a restaurant, an amusement facility, or a public facility, for example. The position of a facility may additionally include information such as the name of the building, the number of floors, and the outline of the facility.

The position of the transportation means may include a relative position such as the car number of a train as well as an absolute position such as the position of a train or a bus. The transportation means is identified, for example, by the type of the train such as "the Shinkansen" and the name of the train such as "Nozomi Super Express No. . . . ".

The congestion degree is information indicating the degree of congestion for each position identified by the position information. The congestion degree is a numerical value or a sign that indicates that the more congested the position identified by the position information becomes, the higher the congestion degree becomes, and the less congested the position identified by the position information becomes, the lower the congestion degree becomes. The congestion degree may be represented by three phases of "high", "moderate", and "low". However, the embodiment is not limited thereto. The congestion degree may be represented by presence or absence of congestion or by high and low (two phases). Furthermore, the congestion degree may be represented by four or more phases or continuous values or signs.

The congestion degree table 134 may be based on information generated by an external device (not illustrated) that is different from the information providing device 100 or information generated by the information providing device 100. In the former case, the information being the origin of the congestion degree table 134 is periodically transmitted to the information providing device 100 from the external device via the network NW. The controller 120, upon receiving a new piece of information, updates the congestion degree table 134 with the new information.

The terminal device 200 includes a communication unit 210, a position detector 220, an operation unit 230, a display unit 240, and a controller 250 as illustrated in FIG. 2, for example.

The communication unit 210 is a communication interface for wireless communication, for example. The Communication unit 210 performs communication with the information providing device 100 via the network NW.

The position detector 220 includes a global navigation satellite system (GNSS) receiver that calculates a position based on radio waves coming from a satellite. Furthermore, the position detector 220 may calculate the current position based on a wireless base station with which the communication unit 210 has established connection or the position information and the field intensity of a Wi-Fi access point. Furthermore, the position detector 220 may correct the position based on an output from an acceleration sensor, for example. The position detector 220 outputs the acquired position information to the controller 250.

The operation unit 230 is an operation device such as a touch panel. The operation unit 230 receives an operation of the user and outputs information indicating the detail of the operation (the coordinates of the touched position, for example) to the controller 250.

The display unit 240 is a display device such as a liquid crystal panel and an organic electroluminescence (EL) panel. The display unit 240 displays information as an image in accordance with display data transmitted from the controller 250. With this configuration, the display unit 240 provides information to the user.

The controller 250 is implemented with a processor such as a CPU executing a computer program for presenting information that is stored in a program memory. Furthermore, the controller 250 may be implemented by hardware such as an LSI, an ASIC, or an FPGA. The controller 250 controls the communication unit 210 to cause the information providing device 100 to transmit the operation information based on the operation received by the operation unit 230 and/or the position information of the terminal device 200. Furthermore, when the communication unit 210 has received the provided information transmitted from the information providing device 100, the controller 250 controls the display unit 240 for the user to cause the provided information to be displayed, for example. The computer program implementing the controller 250 is a user agent (UA) such as a browser or an application program. When the controller 250 is implemented by a browser, the terminal device 200 transmits an HTTP request to the information providing device 100, thereby acquiring the provided information in a form of a web page to present the acquired provided information to the user. It should be noted that the presentation of the provided information to the user may include outputting voice sounds.

The following describes processing for generating the provided information based on the sensitivity with respect to congestion information in the information providing system 1 according to the first embodiment.

Figure 5:
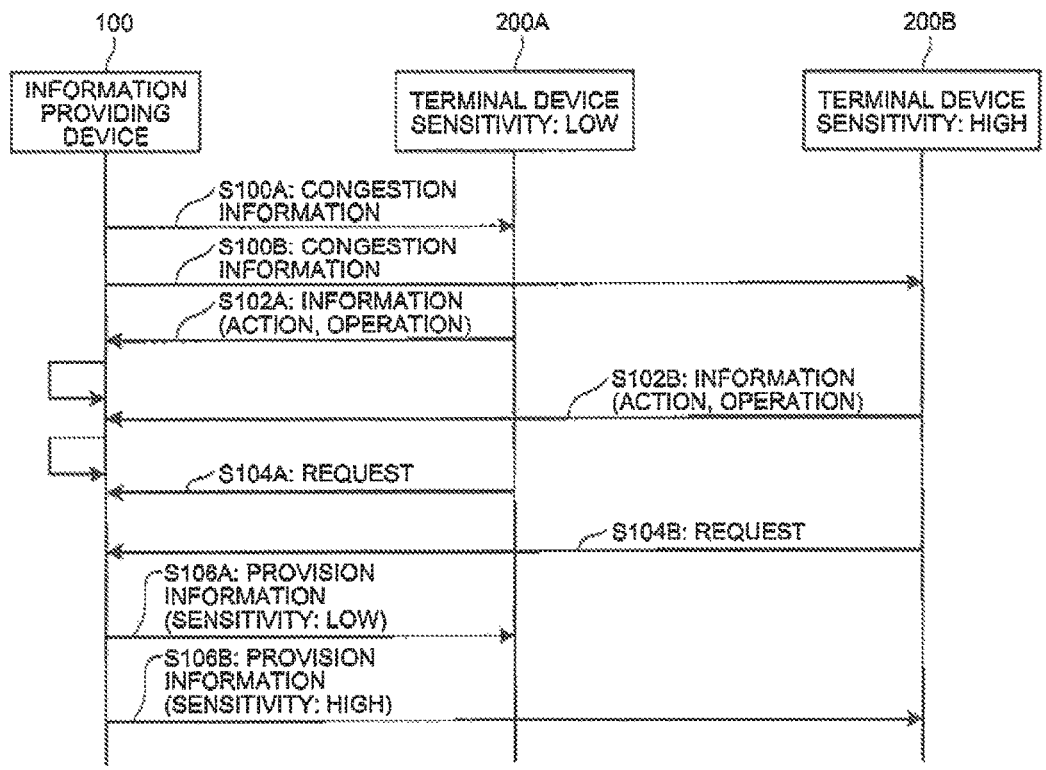
FIG. 5 is a sequence diagram illustrating an example of the flow of pieces of information transmitted and received between an information providing device 100 and a plurality of terminal devices 200 according to the first embodiment.

FIG. 5 is a sequence diagram illustrating an example of the flow of pieces of information transmitted and received between the information providing device 100 and a plurality of terminal devices 200 according to the first embodiment. FIG. 5 illustrates an example in which the provided information is transmitted to two terminal devices 200A and 200B in parallel. However, this mode of transmission and reception is merely an example, and transmission of the provided information to a plurality of terminal devices 200 does not have to be performed in synchronization. The terminal device 200A is a terminal device that has already been determined to present a low sensitivity of the user and the terminal device 200B is a terminal device that has already been determined to present a high sensitivity of the user.

Firstly, to each of the terminal device 200A and the terminal device 200B, congestion information is transmitted from the information providing device 100 (S100A, S100B). In accordance with this, from each of the terminal device 200A and the terminal device 200B, information is transmitted to the information providing device 100 (S102A, S102B). The information transmitted from the terminal device 200A or the terminal device 200B may be transmitted in a manner separated into a plurality of times. Thereafter, once a request has been transmitted to the information providing device 100 from each of the terminal device 200A and the terminal device 200B (S104A, S104B), provided information in accordance with the sensitivity with respect to the congestion information is transmitted from the information providing device 100 (S106A, S106B). At this time, the information providing device 100 generates provided information for the low sensitivity user and transmits the generated provided information to the terminal device 200A. Furthermore, the information providing device 100 generates provided information for the high sensitivity user and transmits the generated provided information to the terminal device 200B.

Figure 6:
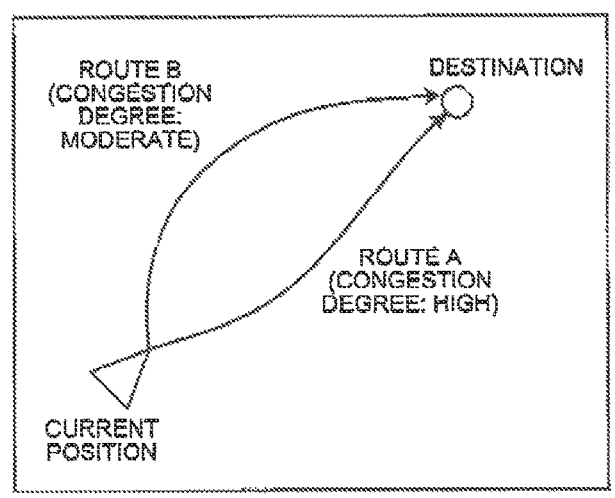
FIG. 6 is a diagram illustrating an example of a display image displayed on a display unit 240 of a terminal device 200 according to the first embodiment.

FIG. 6 is a diagram illustrating an example of a display image displayed on the display unit 240 of a terminal device 200 according to the first embodiment. When route information connecting the current position and a destination is included in the provided information, for example, the information providing device 100 transmits the route information with congestion information added thereto to the terminal device 200. For example, in a case where the user has input a request for searching for a route to a destination in the terminal device 200, when two routes A and B are available, the information providing device 100 derives the congestion degree of each route and transmits pieces of image data each for displaying the congestion degree associated with the corresponding route to the terminal device 200. In this case, the information providing device 100 may calculate an average value of the congestion degrees corresponding to a plurality of spots present in the course of each route as the congestion degree of that route.

FIG. 6 exemplifies a display image in the terminal device 200 in a case where the congestion degree of the route A is calculated as "high" and the congestion degree of the route B is calculated as "moderate". The information for displaying this display image is information for displaying the route A with a high congestion degree and the route B with a low congestion degree compared with the route A in a comparable manner and an example of information for guiding the user to evade from a position with a high congestion degree to a position with a low congestion degree. It should be noted that the information providing device 100 may transmit image data containing character data directly guiding the user from a position with a high congestion degree to a position with a low congestion degree to the terminal device 200, such as "As the route A is congested, the route B is recommended", thereby causing the terminal device 200 to display an image including characters. Furthermore, the information providing device 100 may transmit information for outputting voice sounds instead of characters to the terminal device 200.

The sensitivity derivation unit 122 of the information providing device 100 determines whether the user avoids congestion based on either or both of the operation information and the position information in the information received from the terminal device 200. For example, the sensitivity derivation unit 122 determines that the user who owns the corresponding terminal device 200 is avoiding congestion when the sensitivity derivation unit 122 has received the operation information based on an operation requesting a guide to a position with a low congestion degree from the terminal device 200. Furthermore, when the transition of the position information received from the terminal device 200 indicates a move to a position with a low congestion degree, the sensitivity derivation unit 122 determines that the user who owns the corresponding terminal device 200 is avoiding congestion. In the case of determining that the user is avoiding congestion, the sensitivity derivation unit 122 derives the sensitivity that tends to be higher than in the case of determining that the user is not avoiding congestion.

Figure 7:
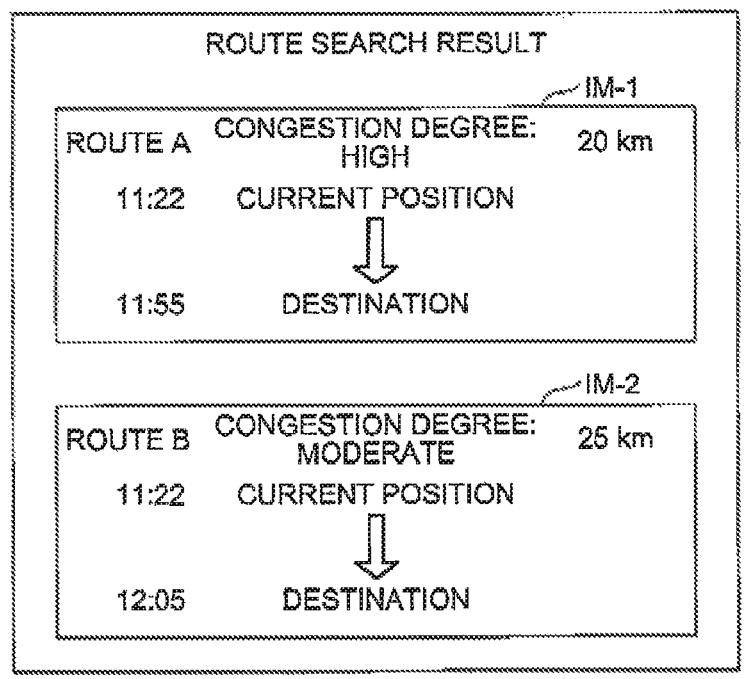
FIG. 7 is a diagram illustrating an example of a display image to be displayed on a terminal device 200A owned by a low sensitivity user.
Figure 8:
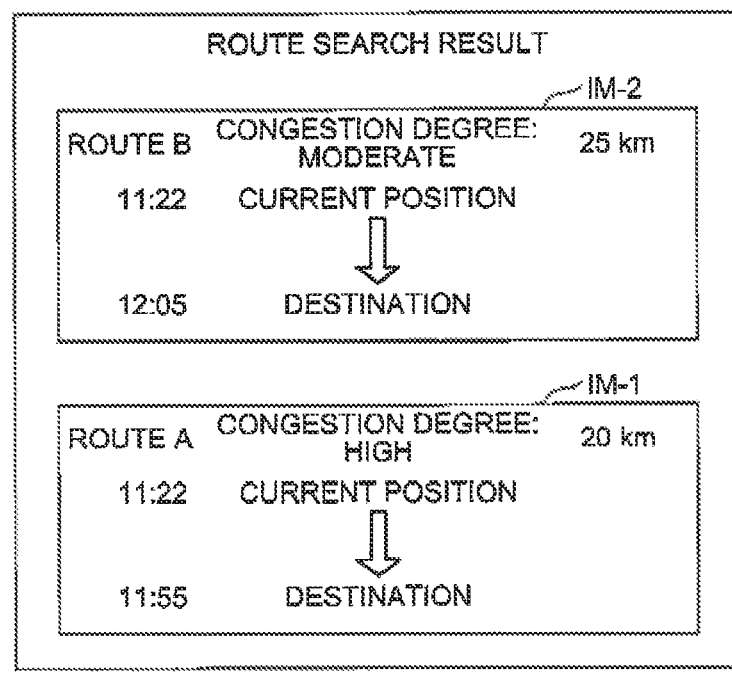
FIG. 8 is a diagram illustrating an example of a display image to be displayed on a terminal device 200B owned by a high sensitivity user.

FIG. 7 is a diagram illustrating an example of a display image to be displayed on the terminal device 200A owned by a low sensitivity user. Furthermore, FIG. 8 is a diagram illustrating an example of a display image to be displayed on the terminal device 200B owned by a high sensitivity user. When the sensitivity of the user is low, as illustrated in FIG. 7, the information providing device 100 generates image data for displaying an image IM-1 presenting the route A with which the moving time and the moving distance are shorter than those with the route B and the congestion degree is "high" in a higher level than an image IM-2 presenting the route B with which the congestion degree is "moderate". By contrast, when the sensitivity of the user is high, as illustrated in FIG. 8, the information providing device 100 generates image data for displaying an image IM-2 presenting the route B with which the moving time and the moving distance are longer than those with the route A and the congestion degree is "moderate" in a higher level than an image IM-1 presenting the route A with which the congestion degree is "high". It should be noted that the information providing device 100 may display only an image presenting a route with which the congestion degree is "moderate" or "low" to a high sensitivity user and display only an image presenting a route with which the congestion degree is "high" to a low sensitivity user.

The information providing device 100 may reduce transmission of the congestion information such as the congestion degree to a low sensitivity user in addition to generating the provided information based on the sensitivity. When the information providing device 100 transmits the route information as illustrated in FIG. 6, for example, the information providing device 100 transmits the route information to the terminal device 200 without adding the congestion information thereto. Furthermore, when the information providing device 100 generates image data of the route A and the route B as illustrated in FIG. 7, the information providing device 100 may generate image data in which the congestion degree for each route is deleted. Furthermore, the information providing device 100 may lower the frequency of transmitting the provided information including the congestion information to the terminal device 200 as processing for reducing transmission of the congestion information.

Figure 9:
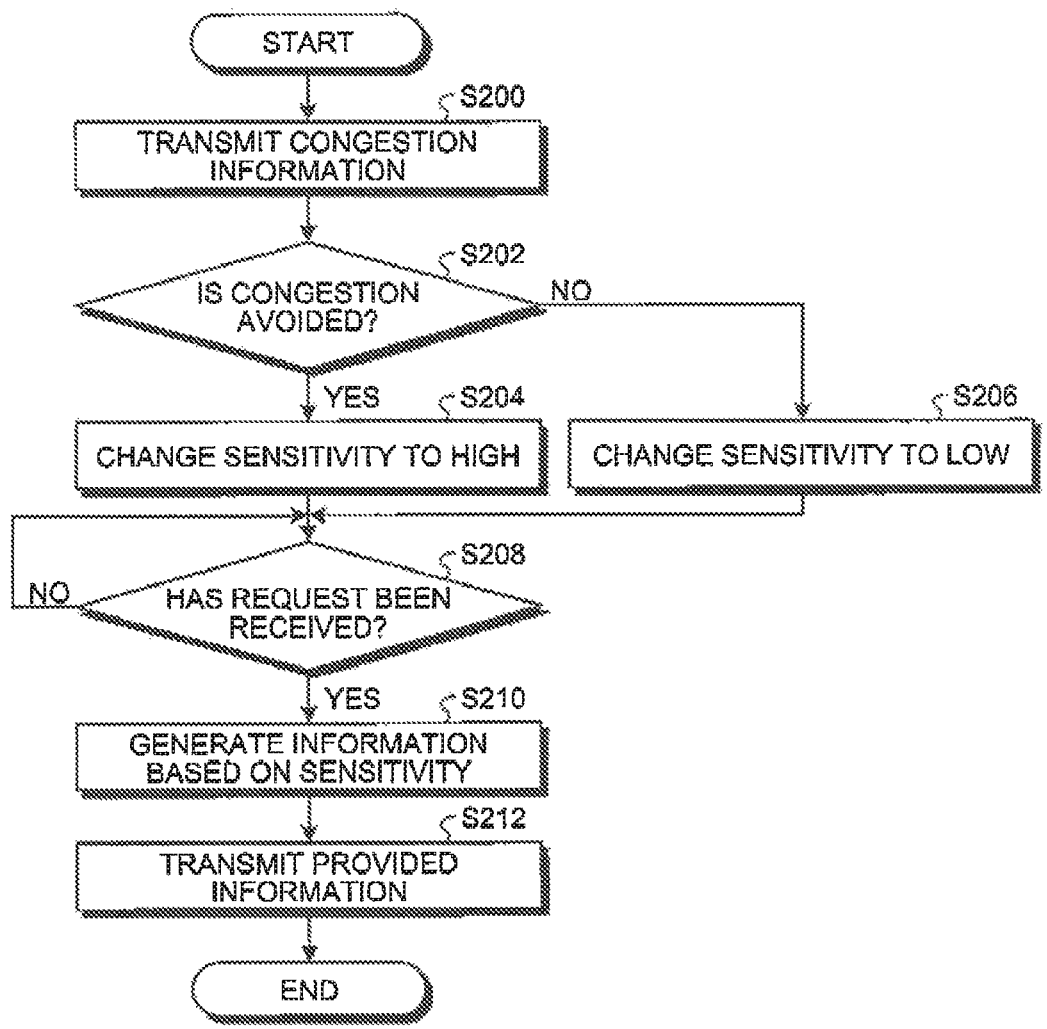
FIG. 9 is a flowchart illustrating an example of the flow of processing performed by the information providing device 100 according to the first embodiment.

FIG. 9 is a flowchart illustrating an example of the flow of processing performed by the information providing device 100 according to the first embodiment. It should be noted that in the following description, it is assumed that the user is permitted to login the information providing device 100 based on the login ID and the password received from the terminal device 200.

Firstly, the information providing device 100 transmits the congestion information to the terminal device 200 (S200). At this point, the information providing device 100 may transmit the congestion information alone as the provided information or transmit the congestion information as a part of the provided information including other information than the congestion information. The terminal device 200, in response to receiving the congestion information, causes the display unit 240 to display an image based on the congestion information.

The information providing device 100 determines whether the user is avoiding congestion based on the information received from the terminal device 200 after transmitting the congestion information (S202).

When the information providing device 100 has determined that the user is avoiding congestion, the information providing device 100 changes the sensitivity to high (S204). By contrast, when the information providing device 100 has determined that the user is not avoiding congestion, the information providing device 100 changes the sensitivity to low (S206).

The information providing device 100 may derive the sensitivity based on determination results for a plurality of times instead of changing the sensitivity for each determination result of one time. The information providing device 100 may change the sensitivity to high in a case where the number of times for which a determination is made that congestion is being avoided is k or more out of n times of determinations, and change the sensitivity to low in a case where the number of times is less than k, for example. n and k are optional natural numbers and n≥k is satisfied. Furthermore, whether the user tends to avoid congestion may be statistically determined by using a method such as moving average.

The information providing device 100 may be configured to set a difference in the updated amount of the sensitivity between a case where a determination has been made whether the user has avoided congestion based on the position information received from the terminal device 200 and a case where a determination has been made whether the user has avoided congestion based on the operation information received from the terminal device 200. For example, the information providing device 100 may be configured to set the updated amount of the sensitivity in a case where the user is actually avoiding (or not avoiding) congestion based on the position information to larger than the updated amount of the sensitivity in a case where the user is actually avoiding (or not avoiding) congestion based on the operation information. This is because change in the position information is thought to be information more directly indicating that the user has avoided congestion than the operation information.

Next, the information providing device 100 waits until receiving a request from the terminal device 200 that requests transmission of provided information (S208). The information providing device 100, upon receiving the request from the terminal device 200, generates provided information based on the sensitivity corresponding to the terminal device 200 (S210). Next, the information providing device 100 transmits the generated provided information to the terminal device 200 (S212). The information providing device 100 transmits the provided information generated based on the derived sensitivity to the terminal device 200, thereby causing the terminal device 200 to provide the user with the provided information with the sensitivity reflected thereon.

In FIG. 9, illustration is made as if the processes at S200 to S212 are performed as one routine. However, the processes at S200 to S206 and the processes at S208 to S212 may be performed independently as separated routines.

The information providing device 100 has been described as generating the provided information in accordance with the request based on the sensitivity. However, the embodiment is not limited thereto. The information providing device 100 may transmit advertisement information to the terminal device 200 based on the sensitivity. The advertisement information is transmitted to the terminal device 200 in a manner added to the directly requested information (a website) or as a push advertisement. For example, the information providing device 100 may transmit advertisement information related to a taxi company to the terminal device 200 when the sensitivity is high, and transmit advertisement information related to a bus company to the terminal device 200 when the sensitivity is low.

With the information providing device 100 according to the first embodiment described above, after a piece of provided information including congestion information is transmitted, another piece of provided information is generated based on the sensitivity derived based on information received from the terminal device 200. With this configuration, more effective information provision can be performed in accordance with the feeling of the user with respect to congestion.

Furthermore, with the information providing device 100 according to the first embodiment, the sensitivity is derived for each user and provided information is generated for each user based on the sensitivity of that user. With this configuration, even if there is individual variation among user reactions with respect to congestion information, information can be provided in accordance with each user. As a result, with the information providing device 100 according to the first embodiment, even more effective information provision can be performed.

Furthermore, the information providing device 100 according to the first embodiment provides the user with information that guides the user to evade from a position with a high congestion degree to a position with a low congestion degree as congestion information. After the guide information is transmitted, the sensitivity is derived based on information received from the terminal device 200. With this configuration, the sensitivity can be derived more accurately.

Furthermore, with the information providing device 100 according to the first embodiment, transmission of provided information including congestion information is reduced for a low sensitivity user, whereby troublesome feeling given to the user who does not need information on congestion can be reduced. In addition, with the information providing device 100, transmission of information on congestion is reduced, whereby the amount of information transmission can be reduced.

Second Embodiment

A second embodiment will be described below. It should be noted that in the description of the second embodiment, the same parts as in the first embodiment will be denoted with the same reference numerals. The information providing device 100 according to the second embodiment derives the sensitivity based on an operation requesting detailed congestion information that has been performed on the terminal device 200. The fact that an operation requesting detailed congestion information has been performed means that the user is interested in congestion. The information providing device 100 according to the second embodiment thus changes the sensitivity to high in response to the user based on receiving information based on the operation requesting detailed congestion information.

Figure 10:
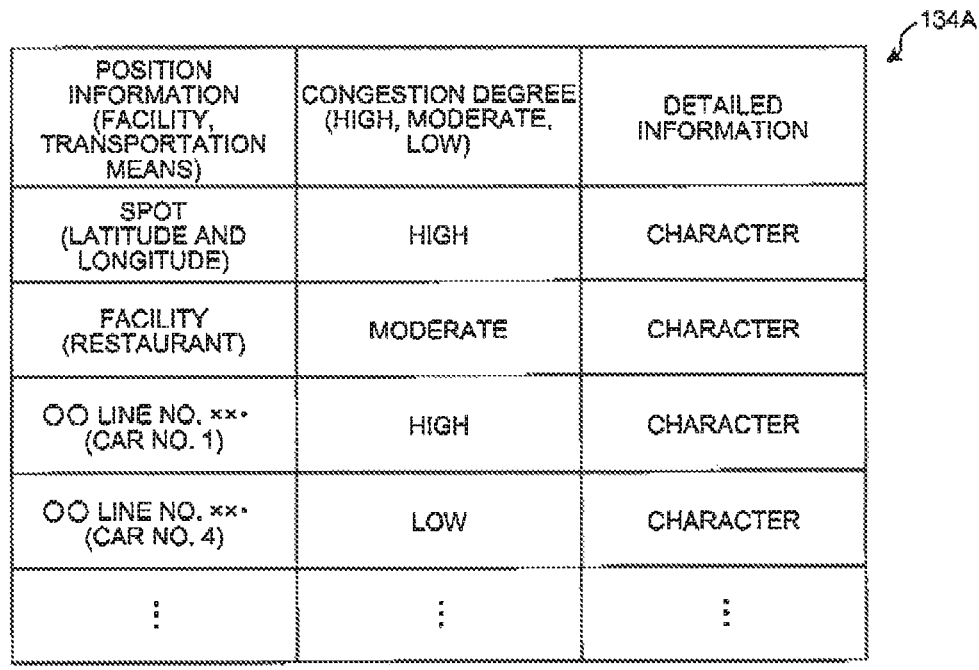
FIG. 10 is a diagram illustrating an example of a congestion degree table 134A according to a second embodiment.

FIG. 10 is a diagram illustrating an example of the congestion degree table 134A according to the second embodiment. The information providing device 100 according to the second embodiment stores the congestion degree table 134A in which detailed information is associated with the position information and the congestion degree in the storage unit 130, as illustrated in FIG. 10. It should be noted that the contents of the congestion degree table 134A are not limited to these. The detailed information is information presenting more detailed congestion conditions than the congestion degree. The detailed information is data for displaying a character image presenting the congestion conditions, for example. However, the detailed information is not limited to this, and may be an optional type of information for presenting detailed congestion conditions to the user. For example, the detailed information may be information for acquiring congestion conditions from an external device. In this case, the detailed information is a uniform resource locator (URL) of a transportation means that provides detailed congestion conditions, for example.

The information providing device 100 according to the second embodiment firstly transmits first congestion information to the terminal device 200. The first congestion information is generated based on the congestion degree. After the first congestion information has been transmitted to the terminal device 200, in a case where a request for second congestion information presenting more detailed congestion conditions than in the first congestion information has been received from the terminal device 200, the information providing device 100 derives the sensitivity that tends to be higher than in a case where a request for the second information has not been received. The second congestion information is generated based on the detailed information.

Figure 11:
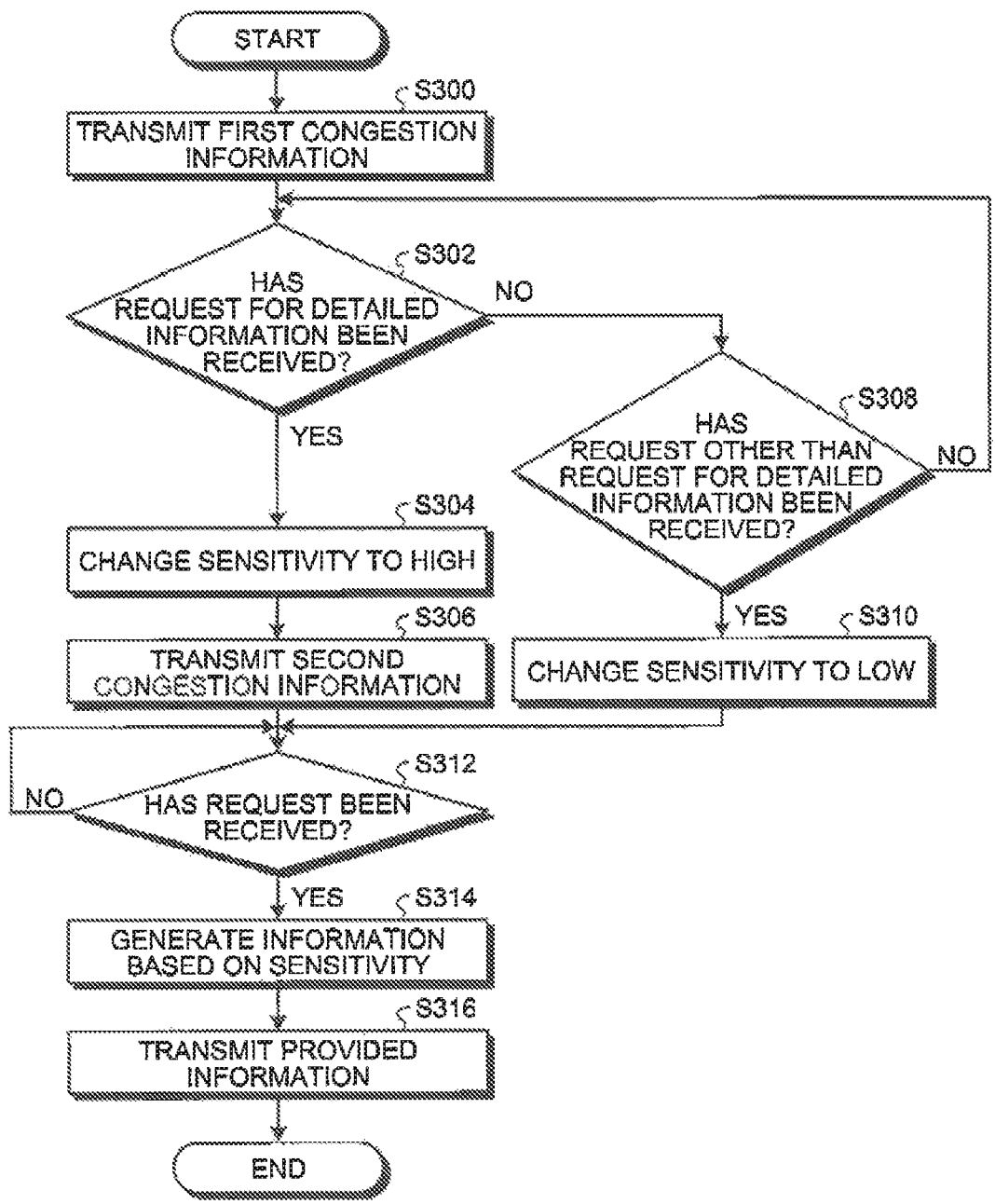
FIG. 11 is a flowchart illustrating an example of the flow of processing performed by the information providing device 100 according to the second embodiment.

FIG. 11 is a flowchart illustrating an example of the flow of processing performed by the information providing device 100 according to the second embodiment. Firstly, the information providing device 100 transmits provided information including the first congestion information to the terminal device 200 (S300).

Figure 12B:
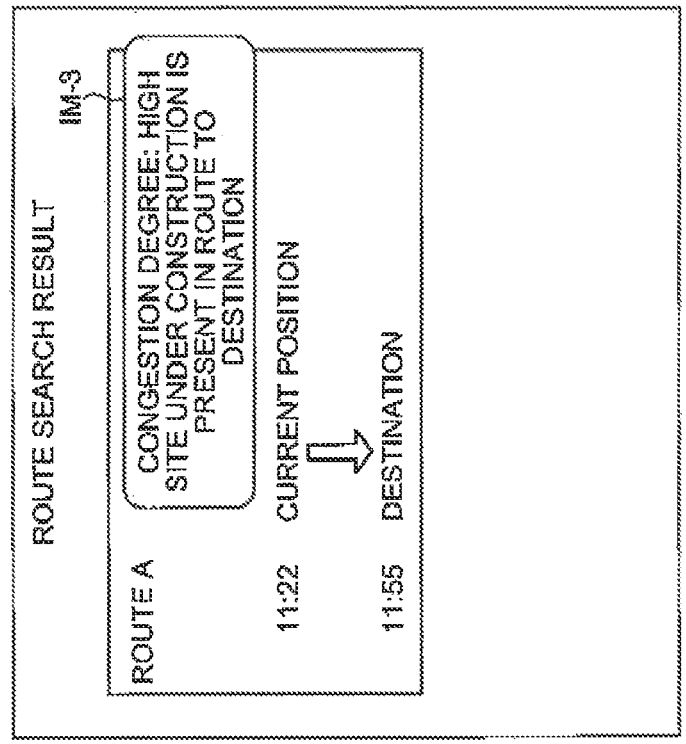
FIGS. 12A and 12B are diagrams each illustrating a display image to be displayed on a terminal device 200 according to the second embodiment.
Figure 12A:
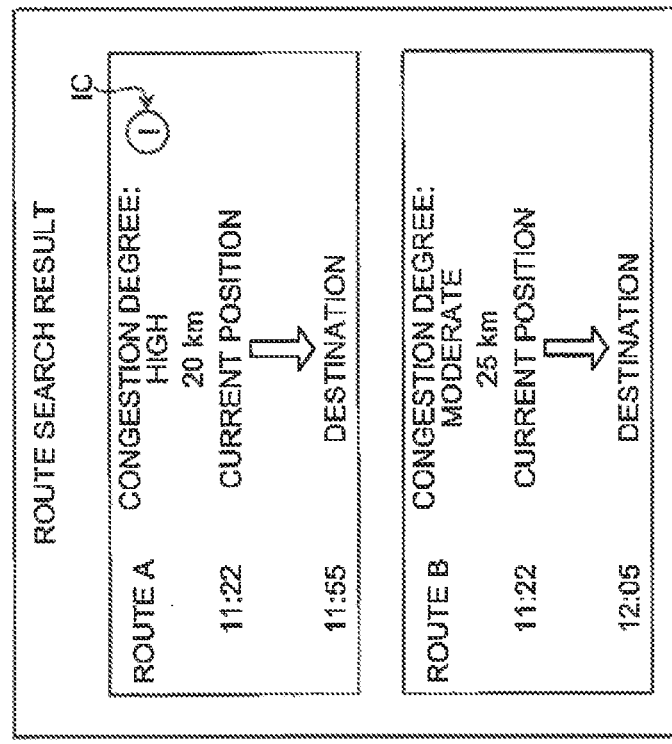

FIGS. 12A and 12B are diagrams each illustrating a display image to be displayed on a terminal device 200 according to the second embodiment. FIG. 12A is an example of a display image based on the first congestion information and FIG. 12B is an example of a display image based on the second congestion information. As illustrated in FIG. 12A, the first congestion information is image data for displaying an image in which the congestion degree of "high" or "moderate" for each route is displayed, for example. In a part of the image, an icon image IC for receiving a request for the detailed information is included.

Next, the information providing device 100 determines whether the request for the detailed information has been received from the terminal device 200 (S302). When the terminal device 200 has detected a tap operation made on the position corresponding to the icon image IC illustrated in FIG. 12A, the terminal device 200 transmits the request for the detailed information to the information providing device 100.

When the information providing device 100 has determined to have received the request for the detailed information from the terminal device 200, the information providing device 100 changes the sensitivity of the user of the terminal device 200 to high (S304). Next, the information providing device 100 transmits the second congestion information to the terminal device 200 (S306). At this time, the information providing device 100 extracts the piece of the detailed information corresponding to the congestion degree being the origin of the information that has already been transmitted as the first congestion information, from the congestion degree table 134A, generates image data based on the extracted piece of the detailed information, and transmits the generated image data to the terminal device 200. As illustrated in FIG. 123, the terminal device 200 displays an image including a character image IM-3 "site under construction is present in the route to the destination" based on the detailed information, for example.

When the information providing device 100 has determined to have not received the request for the detailed information from the terminal device 200, the information providing device 100 determines whether any request other than the detailed information has been received (S308). When the information providing device 100 has not received any request other than the detailed information, the information providing device 100 returns the processing to S302. By contrast, when the information providing device 100 has determined to have received any request other than the detailed information, the information providing device 100 changes the sensitivity to low (S310).

At S308, instead of (or in addition to) determining whether any request other than the detailed information has been received, the information providing device 100 may determine whether a predetermined period of time has elapsed after the transmission of the first congestion information at S300. When a predetermined period of time has not elapsed after the transmission of the first congestion information, the information providing device 100 returns the processing to S302. By contrast, when a predetermined period of time has elapsed after the transmission of the first congestion information, the information providing device 100 proceeds the processing to S310. In such a way, the information providing device 100 may set a time-out for a request of the detailed information.

Next, the information providing device 100 waits until receiving a request that requests transmission of provided information from the terminal device 200 (S312). When the information providing device 100 has received the request from the terminal device 200, the information providing device 100 generates the provided information based on the sensitivity corresponding to the user (S314). Next, the information providing device 100 transmits the generated provided information to the terminal device 200 (S316).

As described above, the information providing device 100 according to the second embodiment derives the sensitivity that tends to be high when the information providing device 100 has received a request for the second congestion information presenting more detailed congestion information than the first congestion information, thereby enabling accurate derivation of the sensitivity.

The information providing device 100 according to the second embodiment may perform derivation of the sensitivity based on the operation information or the position information in parallel with the above-described operation, similarly to the information providing device 100 according to the first embodiment.

Third Embodiment

A third embodiment will be described below. It should be noted that in the description of the third embodiment, the same parts as in the above-described embodiments will be denoted with the same reference numerals. An information providing device 100A according to the third embodiment derives the sensitivity for each of a plurality of conditions under which the user may be put. The information providing device 100A then determines a condition, out of the conditions, to which the user condition corresponds, based on information received by the communication unit 210 from the terminal device 200, and generates provided information based on the sensitivity corresponding to the determined condition.

Figure 13:
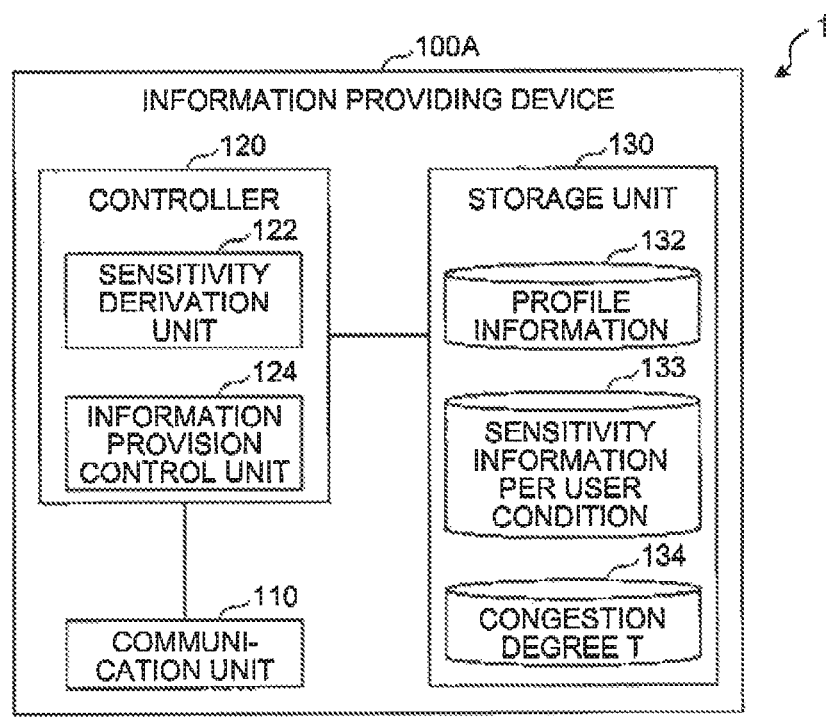
FIG. 13 is a diagram illustrating an example of an information providing device 100A according to a third embodiment.

FIG. 13 is a diagram illustrating an example of the information providing device 100A according to the third embodiment. The information providing device 100A stores sensitivity information per user condition 133 for each user in the storage unit 130. When the information providing device 100A according to the third embodiment has received information from the terminal device 200, the information providing device 100A determines the current condition under which the user is put.

FIG. 14 is a diagram illustrating an example of a plurality of conditions under which a user can be put according to the third embodiment. The conditions under which a user can be put are presented by a combination of reference axes of a plurality of use conditions, for example. The reference axes of the use conditions are set to the day in a week, the place of use, and the scene of use, for example. Days in a week are differentiated into Sunday to Saturday, or a national holiday, for example. Places of use are differentiated into a transportation means, a restaurant, an amusement facility, or a public facility, for example. Scenes of use are differentiated into business or private, for example. It should be noted that reference axes of the use conditions are not limited to the above-mentioned examples and may be set to any items. For example, the reference axes of the use conditions may be set to a period of consecutive holidays and a period other than that, or to a business time and a break time. The business time and the break time are distinguished by the time zone, for example.

FIG. 15 is a diagram illustrating an example of sensitivity information per user condition 133. The "user conditions" in the sensitivity information per user condition 133 is each of the reference axes described with reference to FIG. 14 or a combination thereof. The storage unit 130 stores therein the sensitivity information per user condition 133 for each user. It should be noted that in the present embodiment, the item of the sensitivity may be omitted from the profile information 132.

The sensitivity derivation unit 122 of the information providing device 100A determines the user condition based on the information received from the terminal device 200, and in the state in which the user condition has been determined, derives the sensitivity of the user under each condition. For derivation processing of the sensitivity under each condition, processing described in the first embodiment or the second embodiment can be utilized. When the information provision control unit 124 of the information providing device 100A generates provided information to be transmitted to the terminal device 200, the information provision control unit 124 determines the user condition based on the information received from the terminal device 200, for example, and generates provided information based on the sensitivity corresponding to the determined current user condition.

FIG. 16 is a flowchart illustrating an example of the flow of processing performed by the information providing device 100A according to the third embodiment. Firstly, the information providing device 100A determines the user condition (S400). At this time, the information providing device 100A determines a place of use or a scene of use based on the information received from the terminal device 200 and other types of information. The information providing device 100A determines a day in a week, for example, by means of a clock function retained therein. Furthermore, the information providing device 100A determines a place of use based on the position information transmitted from the terminal device 200. In addition, the information providing device 100A may determine a scene of use based on historical information that has already been stored, the determined day in a week, the determined place of use, or a combination of these.

Next, the information providing device 100A transmits the congestion information to the terminal device 200 (S402). Next, the information providing device 100A determines whether the user who owns the terminal device 200 which has received the congestion information at S402 is avoiding congestion (S404).

When the information providing device 100A has determined that the user who owns the terminal device 200 is avoiding congestion, the information providing device 100A changes the sensitivity in accordance with the use condition corresponding to the user condition determined at S400 to high (S406). By contrast, when the information providing device 100A has determined that the user who owns the terminal device 200 is not avoiding congestion, the information providing device 100A changes the sensitivity in accordance with the use condition corresponding to the user condition determined at S400 to low (S408).

Next, the information providing device 100A waits until receiving a request that requests transmission of provided information from the terminal device 200 (S410). When the information providing device 100A has received a request from the terminal device 200, the information providing device 100A determines the current use condition of the user (S412). At this time, the information providing device 100A performs the same processing as in S400. Next, the information providing device 100A generates provided information based on the sensitivity corresponding to the user condition corresponding to the determined current use condition of the user (S414). Next, the information providing device 100A transmits the generated provided information to the terminal device 200 (S416).

In FIG. 16, illustration is made as if the processes at S400 to S416 are performed as one routine. However, the processes at S400 to S408 and the processes at S410 to S416 may be performed independently as separated routines.

With the information providing device 100A according to the third embodiment described above, the sensitivity is derived for each of a plurality of conditions under which the user may be put, and the provided information is generated based on the sensitivity corresponding to the user condition, thereby enabling more accurate derivation of the sensitivity.

Fourth Embodiment

A fourth embodiment will be described below. It should be noted that in the description of the fourth embodiment, the same parts as in the above-described embodiments will be denoted with the same reference numerals. When the information providing device 100 according to the fourth embodiment transmits future information as provided information, the information providing device 100 transmits congestion information in which a future congestion condition related to the future information is predicted to the terminal device 200.

FIG. 17 is a flowchart illustrating an example of the flow of processing performed by the information providing device 100 according to the fourth embodiment. Firstly, the information providing device 100 determines whether a request of future information has been received (S500). When date information included in the request is of the future, the information providing device 100 determines that the provided information requested by the received request is future information. However, the embodiment is not limited thereto.

When the information providing device 100 has determined to have not received a request for future information, similarly to the first to the third embodiments, the information providing device 100 proceeds to processing based on the request for information of the current status. When the information providing device 100 has determined to have received a request for future information, the information providing device 100 transmits the predicted congestion information (S502). At this time, the information providing device 100 predicts congestion information to be included in the provided information. At this time, the information providing device 100 acquires the position information and the time zone based on the requested future information. The information providing device 100 extracts a congestion degree in the past corresponding to the acquired position information and the time zone. The information providing device 100 predicts a future congestion degree based on the extracted congestion degree in the past. Furthermore, the information providing device 100 may predict a future congestion degree based on a congestion degree in the past that corresponds to a future use condition of the user.

Next, the information providing device 100 waits until receiving the operation information (S504). When the information providing device 100 has received the operation information, the information providing device 100 updates the sensitivity based on the operation information (S506). At this time, the information providing device 100 derives the sensitivity by means of various methods similarly to the first to the third embodiments.

Next, the information providing device 100 waits until receiving a request that requests transmission of provided information from the terminal device 200 (S508). When the information providing device 100 has received a request from the terminal device 200, the information providing device 100 generates the provided information based on the sensitivity corresponding to the terminal device 200 (S510). Next, the information providing device 100 transmits the generated provided information to the terminal device 200 (S512).

In the fourth embodiment, the information providing device 100 derives the sensitivity based on the operation information. However, the embodiment is not limited thereto, and the information providing device 100 may derive the sensitivity based on the position information. In this case, the information providing device 100 derives the sensitivity that tends to be higher in a case where the predicted congestion degree is "high" and the current position has been changed by an action started to avoid the future congestion than in a case where the current position has not been changed.

As described above, when the information providing device 100 according to the fourth embodiment transmits future information as provided information, the information providing device 100 can control transmission of the future provided information based on the sensitivity in order to transmit congestion information in which a future congestion condition is predicted to the terminal device 200.

First Modification

A first modification of the above-described first to fourth embodiments will be described below. In the first modification, the information providing device 100 transmits a plurality of pieces of provided information corresponding to different sensitivities and the sensitivity to each of the terminal devices 200. Each of the terminal devices 200 selects the piece of the provided information corresponding to the received sensitivity by itself to present the selected piece of the provided information to the user. The terminal device 200 may select the piece of provided information by means of an application program or by means of a script embedded in a web page.

Figure 18:
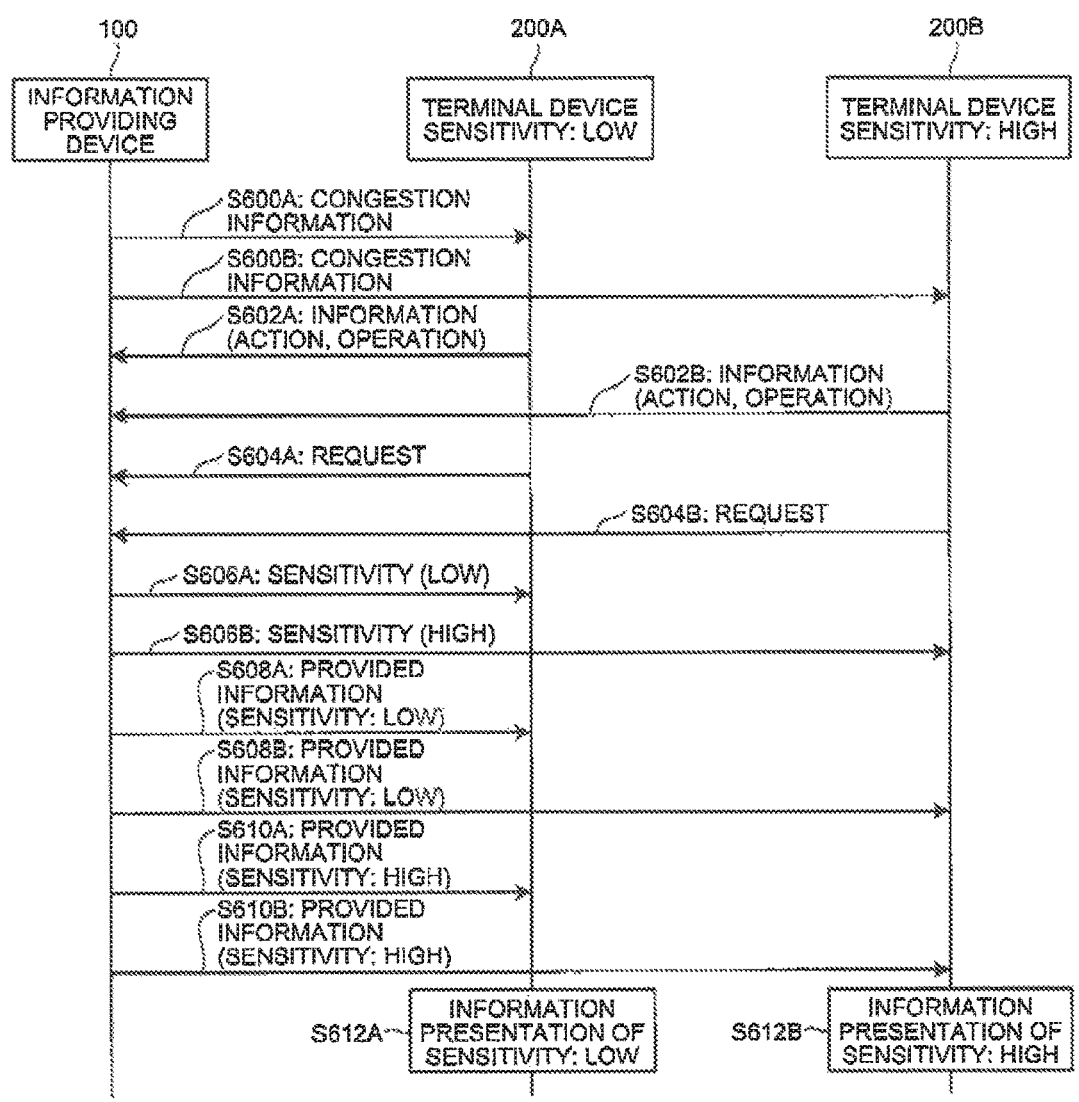
FIG. 18 is a sequence diagram illustrating an example of the flow of pieces of information transmitted and received between the information providing device 100 and the terminal device 200A and the terminal device 200B according to a first modification.

FIG. 18 is a sequence diagram illustrating an example of the flow of pieces of information transmitted and received between the information providing device 100 and the terminal device 200A and the terminal device 200B according to the first modification. FIG. 18 illustrates an example in which the provided information is transmitted to two terminal devices of the terminal device 200A and the terminal device 200B in parallel. However, this mode of transmission and reception is merely an example, and transmission of the provided information to a plurality of terminal devices 200 does not have to be performed in synchronization. The terminal device 200A is a terminal device that has already been determined to present a low sensitivity of the user and the terminal device 200B is a terminal device that has already been determined to present a high sensitivity of the user.

Firstly, congestion information is transmitted to each of the terminal device 200A and the terminal device 200B from the information providing device 100 (S600A, S600B). In accordance with this, information is transmitted to the information providing device 100 from each of the terminal device 200A and the terminal device 200B (S602A, S602B). The information transmitted from each of the terminal device 200A and the terminal device 200B may be transmitted in a manner separated into a plurality of times.

Thereafter, when a request has been transmitted from each of the terminal device 200A and the terminal device 200B to the information providing device 100 (S604A, S604B), the sensitivity of the user of the terminal device 200A, provided information for a low sensitivity user, and provided information for a high sensitivity user are transmitted from the information providing device 100 to the terminal device 200A (S606A, S608A, S610A). In the terminal device 200A, based on the sensitivity (low) received at S606A, the provided information for a low sensitivity user is selected to be presented to the user (S612A).

By contrast, to the terminal device 200B, the sensitivity of the user of the terminal device 200B, provided information for a low sensitivity user, and provided information for a high sensitivity user are transmitted from the information providing device 100 (S606B, S608B, S610B). In the terminal device 200B, based on the sensitivity (high) received at S606B, the provided information for a high sensitivity user is selected to be presented to the user (S612B).

Selecting any piece of provided information and presenting the selected piece of provided information includes causing the piece of provided information that corresponds to the received sensitivity to be displayed and causing other pieces of provided information that do not correspond to the received sensitivity to be hidden. Furthermore, selecting any piece of provided information and presenting the selected piece of provided information, in a case where a plurality of pieces of provided information are displayed in a list form, includes causing the image of the piece of provided information that corresponds to the received sensitivity to be displayed in a higher level and to be emphasized with the size and the color thereof, for example.

According to the terminal device 200 in the first modification, the sensitivity of the user is received from the information providing device 100, and based on the sensitivity, a piece of information to be provided is selected from a plurality of pieces of provided information, whereby the same effect can be achieved as in the above-described embodiments.

Second Modification

A second modification will be described below. The information providing device 100 in the second modification does not derive the sensitivity for each user, but derives the sensitivity for each group of users or for each use condition without differentiating users. FIGS. 19A and 19B are diagrams each explaining processing according to the second modification. The information providing device 100 in the second modification provides the same provided information and congestion information to a plurality of users who use the same route in some cases. More specifically, the information providing device 100, as illustrated in FIG. 19A, transmits the congestion information of the route A (congestion degree: high) to a users (a is a natural number equal to or larger than 1), and at the same time, transmits the congestion information of the route B (congestion degree: low) to b users (b is a natural number equal to or larger than 1).

After the information providing device 100 has transmitted the provided information and the congestion information, as illustrated in FIG. 19B, detects that the number of users for the route A is decreased by α and the number of the users for the route B is increased by β. The information providing device 100 then compares each of the decrease rate of the number of the users for the route A (α/a) and the increase rate of the number of the users for the route B (β/b) with a threshold, thereby deriving the sensitivity of the users who attempt to use the route A and the sensitivity of the users who attempt to use the route B, respectively.

As a result, the information providing device 100 in the second modification proceeds not to transmit the congestion information of the route for which the derived sensitivity is low to the corresponding terminal devices 200, and transmit only the congestion information of the route for which the derived sensitivity is high to the terminal devices 200. With this configuration, the information providing device 100 in the second modification can provide more effective congestion information.

Others

In the above-described embodiments and modifications, the descriptions have been made based on the assumption that one user corresponds to one terminal device 200. However, it can also be assumed that the same terminal device 200 is used by different users. Based on this assumption, the "terminal device determined to present a high (low) sensitivity of the user" may read the "terminal device determined to present a high (low) sensitivity of the logged-in user."

Application Examples

Application examples of the above-described embodiments and modifications will be described below. FIG. 20 is a diagram explaining a first application example. In the first application example, the communication unit 110 of the information providing device 100 transmits a plurality of pieces of provided information indicating transportation means and congestion information presenting congestion conditions of the transportation means included in the pieces of provided information to the terminal device 200. The information providing device 100 transmits provided information including congestion information presenting the congestion degree for each car of a train to the terminal device 200. This provided information may include the position information of the terminal device 200 that has been acquired from the terminal device 200 in advance, and as illustrated in FIG. 20, the terminal device 200 displays the congestion degree of each car from the car No. 1 to the car No. 4 of the train and a position P of the user with respect to the position of each car.

Furthermore, the information providing device 100 receives the position information after the terminal device 200 is caused to perform display as illustrated in FIG. 20. When the user has moved to a car with a low congestion degree based on the received position information, the information providing device 100 derives the sensitivity that tends to be higher than in a case where the user has not moved to a car with a low congestion degree.

Figure 21A:
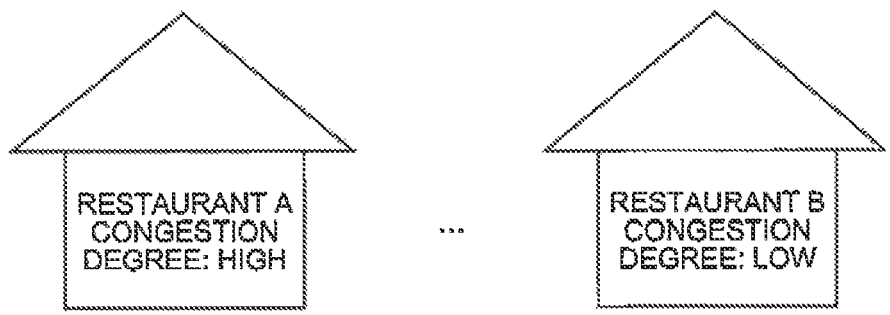
FIGS. 21A and 21B are diagrams each explaining a second application example.
Figure 21B:
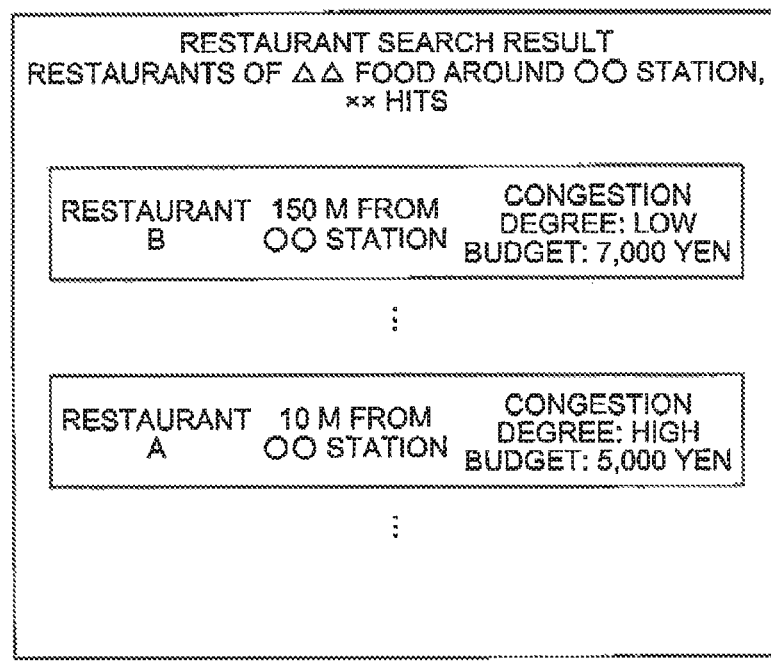

FIGS. 21A and 21B are diagrams each explaining a second application example. In the second application example, the information providing device 100 transmits a plurality of pieces of provided information indicating facilities and congestion information presenting congestion conditions of the facilities included in the pieces of provided information are transmitted to the terminal device 200. The information providing device 100 transmits provided information introducing restaurants and the congestion information of the restaurants to the terminal device 200. FIG. 21A is an example of an image displaying a plurality of restaurants and the congestion degree thereof in a list form.

When the information providing device 100 has received any request from the terminal device 200, the information providing device 100 transmits provided information based on the sensitivity of the user of the terminal device 200 to the terminal device 200. FIG. 21B is an example of an image displayed using the provided information based on the sensitivity of the user. In this image, when the sensitivity of the user is high, an image of a restaurant with a low congestion degree is displayed in a higher level than an image of a restaurant with a high congestion degree. In the example of FIG. 21B, the terminal device 200 displays in a higher level an image of a restaurant B that is farther from the oo station and needs a higher budget but has a lower congestion degree than a restaurant A.

Hardware Configuration

Figure 22:
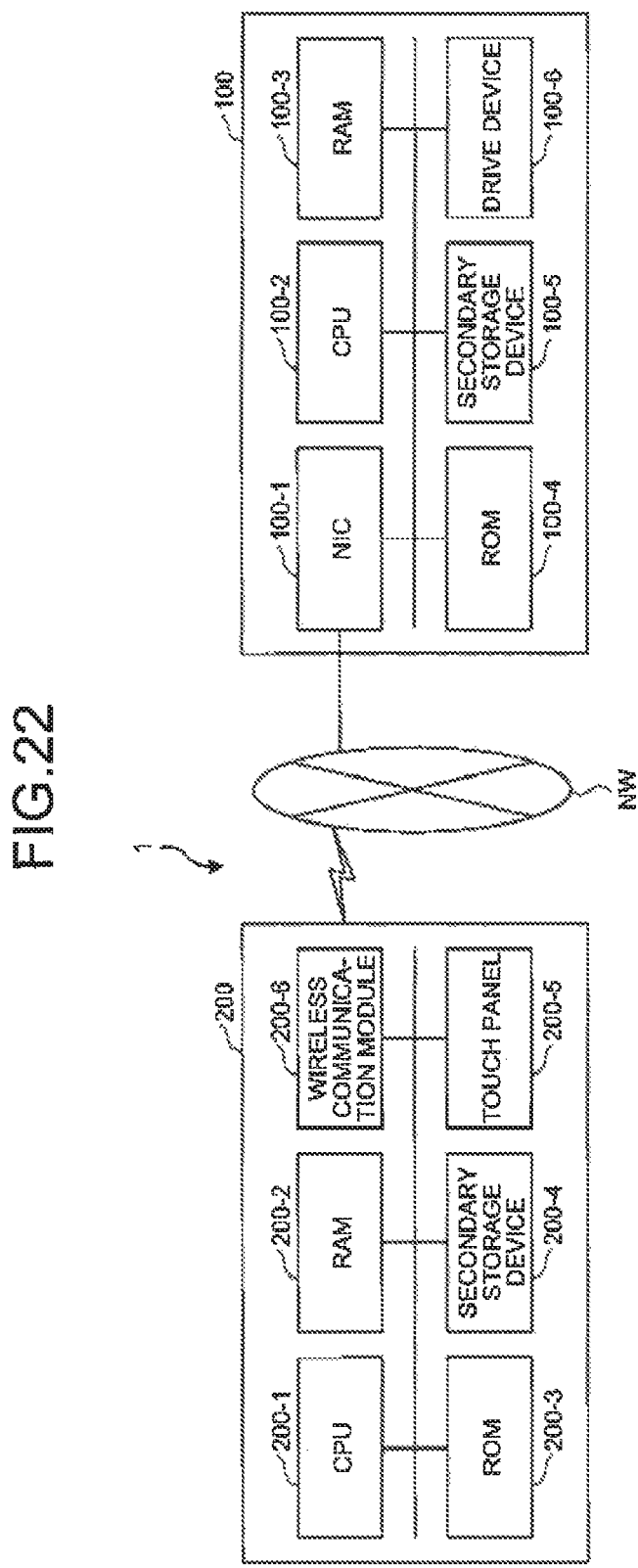
FIG. 22 is a diagram illustrating an example of the hardware configurations of the information providing device 100 and a terminal device 200 according to an embodiment.

The information providing device 100 and the terminal device 200 in the above-described embodiments are implemented by a hardware configuration as illustrated in FIG. 22, for example. FIG. 22 is a diagram illustrating an example of the hardware configurations of the information providing device 100 and the terminal device 200 according to an embodiment. FIG. 22 illustrates an example in which the terminal device 200 is a mobile phone.

The information providing device 100 includes an NIC 100-1, a CPU 100-2, a RAM 100-3, a ROM 100-4, a secondary storage device 100-5 such as a flash memory and an HDD, and a drive device 100-6 that are connected to one another via an internal bus or a dedicated communication line. On the drive device 100-6, a mobile storage medium such as an optical disk is mounted. A computer program for information provision stored in the mobile storage medium mounted on the secondary storage device 100-5 or the drive device 100-6 is loaded in the RAM 100-3 by a direct memory access (DMA) controller (not illustrated) and executed by the CPU 100-2, whereby each functional part of the controller 120 is implemented. The computer program for information provision may be downloaded by other devices via the network NW.

The terminal device 200 includes a CPU 200-1, a RAM 200-2, a ROM 200-3, a secondary storage device 200-4 such as a flash memory, a touch panel 200-5, and a wireless communication module 200-6 that are connected to one another via an internal bus or a dedicated communication line. The wireless communication module 200-6 accesses a wireless base station to be connected to the network NW. The wireless communication module 200-6 corresponds to the communication unit 210 and the touch panel 200-5 corresponds to the operation unit 230 and the display unit 240. Furthermore, a computer program stored in the secondary storage device 200-4 is loaded in the RAM 200-2 by a DMA controller (not illustrated) or the like and executed by the CPU 200-1, whereby the controller 250 is implemented.

According to another aspect of an embodiment, a non-transitory computer readable storage medium has stored therein a program causing a computer to execute a process including, receiving sensitivity of a user who owns the terminal device from an information providing device, receiving a plurality of pieces of provided information including congestion information presenting a congestion condition from the information providing device, and switching display among the pieces of provided information with different congestion conditions based on the received sensitivity.

According to another aspect of an embodiment, a control method of a terminal device includes, generating provided information provided to a user in the terminal device and optionally including congestion information presenting a congestion condition and transmitting the generated provided information to the terminal device to cause the terminal device to provide the provided information to the user, deriving sensitivity with respect to the congestion information based on information received from the terminal device after presenting the congestion information, and transmitting the provided information generated based on the derived sensitivity to the terminal device to cause the terminal device to provide the provided information with the sensitivity reflected thereon to the user.

According to an embodiment of the present invention, more effective information provision can be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A navigation device comprising:
a communication interface that communicates with a terminal device used by a user; and
a processor programmed to:
upon receipt, from the terminal device, of destination information indicating a destination position:
determine a plurality of routes to the destination position;
specify congestion of each of the plurality of routes;
provide, to the terminal device, congestion information indicating the plurality of routes and the specified congestion of each of the plurality of routes;
acquire, from the terminal device, action information indicating a route which is selected from the plurality of routes by the user;
based on the level of the congestion of the selected route indicated by the acquired action information, calculate a congestion sensitivity level of the user which indicates a level of the user's sensitivity for the congestion of the selected route indicated by the acquired action information; and
upon receipt of new destination information: provide new congestion information indicating newly determined routes to a new destination position indicated by the new destination information, and information indicating congestion of the newly determined routes in a mode according to the calculated congestion sensitivity level by causing the communication interface to transmit the new congestion information to the terminal device.

2. The navigation device according to claim 1, wherein the processor is further programmed to: calculate a second congestion sensitivity level for a second user, and provide information to the second user based on the calculated second congestion sensitivity level.

3. The navigation device according to claim 1, wherein the processor is further programmed to: generate information for guiding the user to evade from a position with a high congestion degree to a position with a low congestion degree as the new congestion information.

4. The navigation device according to claim 3, wherein the processor is further programmed to: generate information for the terminal device to display the position with the high congestion degree and the position with the low congestion degree in a comparable manner as the new congestion information.

5. The navigation device according to claim 3, wherein the processor is further programmed to:
determine whether the user is avoiding congestion based on operation information that is information related to an operation performed in the terminal device by the user and received by the communication interface from the terminal device after the information for guiding has been transmitted, and
in the case of determining that the user is avoiding congestion, derive the congestion sensitivity level to be higher than in the case of determining that the user is not avoiding congestion.

6. The navigation device according to claim 5, wherein the processor is further programmed to: determine that the user is avoiding congestion when the communication interface has received the operation information based on an operation for requesting a guide to the position with a low congestion degree.

7. The navigation device according to claim 3, wherein the processor is further programmed to:
determine whether the user is avoiding congestion based on position information of the terminal device that has been received by the communication interface from the terminal device after the information for guiding has been transmitted, and
in the case of determining that the user is avoiding congestion, derive the congestion sensitivity level to be higher than in the case of determining that the user is not avoiding congestion.

8. The navigation device according to claim 1, wherein the processor is further programmed to:
in a case where after first congestion information has been transmitted to the terminal device by the communication interface, a request for second congestion information presenting a more detailed congestion condition than in the first congestion information has been received by the communication interface from the terminal device, derive the congestion sensitivity level to be higher than in a case where a request for the second information has not been received.

9. The navigation device according to claim 1, wherein the processor is further programmed to:
derive the congestion sensitivity level, for each of a plurality of conditions under which the user is possibly put,
determine a condition, out of the conditions, to which a user condition corresponds, based on information received by the communication interface from the terminal device, and
generate the provided congestion information based on the congestion sensitivity level corresponding to the determined condition.

10. The navigation device according to claim 1, wherein the processor is further programmed to: when the communication interface is caused to transmit current information as the congestion information, cause the communication interface to transmit congestion information presenting a current congestion condition related to the current information.

11. The navigation device according to claim 1, wherein the processor is further programmed to: when the communication interface is caused to transmit future information as the congestion information, cause the communication interface to transmit congestion information in which a future congestion condition related to the future information is predicted to the terminal device.

12. The navigation device according to claim 1, wherein the processor is further programmed to: narrow a plurality of pieces of the congestion information before transmitting by the communication interface based on the calculated congestion sensitivity level.

13. The navigation device according to claim 1, wherein the processor is further programmed to: cause the communication interface to transmit a plurality of pieces of congestion information with different congestion conditions and the congestion sensitivity level to the terminal device to cause the terminal device to switch display among the pieces of congestion information with different congestion conditions based on the congestion sensitivity level.

14. The navigation device according to claim 1, wherein the processor is further programmed to: cause the communication interface to transmit a plurality of pieces of congestion information indicating recommended transportation means and presenting the congestion condition of each of the transportation means included in each piece of the congestion information to the terminal device.

15. The navigation device according to claim 1, wherein the processor is further programmed to: cause the communication interface to transmit a plurality of pieces of congestion information indicating outlines of facilities and presenting the congestion condition of each of the facilities included in each piece of the congestion information to the terminal device.

16. A navigation method comprising:
upon receipt, from a terminal device via a communication interface, of destination information indicating a destination position:
determining, by an information processing device, a plurality of routes to the destination position;
specifying, by the information processing device, congestion of each of the plurality of routes;
providing, to the terminal device by the information processing device, congestion information indicating the plurality of routes and the specified congestion of each of the plurality of routes;
acquiring, from the terminal device by the information processing device, action information indicating a route which is selected from the plurality of routes by the user;
based on the level of the congestion of the selected route indicated by the acquired action information, calculating, by the information processing device, a congestion sensitivity level of the user which indicates a level of the user's sensitivity for the congestion of the selected route indicated by the acquired action information; and upon receipt of new destination information by the information providing device: providing, by the information processing device, new congestion information indicating newly determined routes to a new destination position indicated by the new destination information, and information indicating congestion of the newly determined routes in a mode according to the calculated congestion sensitivity level by causing the communication interface to transmit the new congestion information to the terminal device.

17. A non-transitory computer readable storage medium having stored therein a program that, when executed by a processor, causes the processor to:
upon receipt, from a terminal device via a communication interface, of destination information indicating a destination position:
determine a plurality of routes to the destination position;
specify congestion of each of the plurality of routes;
provide, to the terminal device, congestion information indicating the plurality of routes and the specified congestion of each of the plurality of routes;
acquire, from the terminal device, action information indicating a route which is selected from the plurality of routes by the user;
based on the level of the congestion of the selected route indicated by the acquired action information, calculate a congestion sensitivity level of the user which indicates a level of the user's sensitivity for the congestion of the selected route indicated by the acquired action information; and
upon receipt of new destination information: provide new congestion information indicating newly determined routes to a new destination position indicated by the new destination information, and information indicating congestion of the newly determined routes in a mode according to the calculated congestion sensitivity level by causing the communication interface to transmit the new congestion information to the terminal device.

* * * * *